United States Patent
Pattnayak et al.

(10) Patent No.: US 11,765,564 B2
(45) Date of Patent: Sep. 19, 2023

(54) LOW-LATENCY BLUETOOTH CONNECTIVITY

(71) Applicant: Google LLC, Mountain View, CA (US)

(72) Inventors: Tapan Pattnayak, San Jose, CA (US); Aaron Chen, Taipei (TW); Wei-Ning Huang, Taipei (TW); Martin A. Turon, Berkeley, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/560,808

(22) Filed: Dec. 23, 2021

(65) Prior Publication Data

US 2022/0232361 A1   Jul. 21, 2022

Related U.S. Application Data (60) Provisional application No. 63/138,484, filed on Jan. 17, 2021.

(51) Int. Cl.
*H04W 4/80* (2018.01)
*H04L 1/1607* (2023.01)
*H04W 76/10* (2018.01)

(52) U.S. Cl.
CPC ............. *H04W 4/80* (2018.02); *H04L 1/1607* (2013.01); *H04W 76/10* (2018.02)

(58) Field of Classification Search
CPC ...... H04W 4/80; H04W 76/10; H04L 1/1607; H04L 1/16
See application file for complete search history.

(56) References Cited

U.S. PATENT DOCUMENTS

| | | | |
|---|---|---|---|
| 9,288,759 B2 * | 3/2016 | Kerai | H04W 84/20 |
| 2010/0265856 A1 | 10/2010 | Yang | |
| 2012/0220351 A1 | 8/2012 | Kerai et al. | |
| 2015/0289283 A1 | 10/2015 | Ko et al. | |
| 2017/0095693 A1 * | 4/2017 | Chang | G16H 40/40 |

OTHER PUBLICATIONS

Lenart, "Bluetooth Low Energy Sniffing Guide", Accessed online at: https://www.polidea.com/blog/bluetooth-low-energy sniffing-guide/, Oct. 24, 2018.

* cited by examiner

*Primary Examiner* — Tuan H Nguyen
(74) *Attorney, Agent, or Firm* — Colby Nipper PLLC (57) ABSTRACT

This document describes low-latency Bluetooth connectivity in a wireless network in which a central node and a peripheral node establish a connection. During a first connection interval, the peripheral node receives a packet from the central node to synchronize communication with the central node, and based on receiving the packet, the peripheral node transmits a first fixed-length packet. If the first fixed-length packet fails to reach the central node, the peripheral node does not receive an acknowledgement, ACK, from the central node during the first connection interval and retransmits the first fixed-length packet during the first connection interval.

14 Claims, 7 Drawing Sheets

LOW-LATENCY BLUETOOTH CONNECTIVITY

CROSS-REFERENCE TO RELATED APPLICATION

This application claims priority to U.S. Provisional Application Ser. No. 63/138,484, filed Jan. 17, 2021, the disclosure of which is incorporated herein by reference.

BACKGROUND

Using low-power wireless networking, such as wireless mesh networking, to connect devices to each other and to cloud-based services is increasingly popular for sensing environmental conditions, controlling equipment, and providing information and alerts to users. Wireless networking protocols embody tradeoffs between communication latency and low-power operation to support battery-powered devices.

When communication packets are not received as expected, wireless network protocols may use retry mechanisms with increasing time delays to attempt to reestablish communication between devices. While these mechanisms may reduce power consumption, the increasing time delays also increase communication latency and affect the responsiveness a user perceives when using these wireless devices and systems. There are opportunities to reduce communication latency while still maintaining low-power operation.

SUMMARY

This document describes low-latency Bluetooth connectivity in a wireless network in which a central node and a peripheral node establish a connection using fixed-length packets to reduce connection and retry latency. In conventional Bluetooth Low Energy (BLE) systems that employ variable packet lengths, only a single connection event can occur during a connection interval with a retry occurring in the next connection interval. Unlike conventional BLE, during a first connection interval, the peripheral node receives a packet from the central node to synchronize communication with the central node, and based on receiving the packet, the peripheral node transmits a first fixed-length packet. If the first fixed-length packet fails to reach the central node, the central node does not transmit an acknowledgement packet. Based on not receiving an acknowledgement during the first connection interval, the peripheral node retransmits the first fixed-length packet during the first connection interval. Retransmitting within the same connection interval reduces the latency of retransmission as compared to conventional BLE retransmissions (e.g., reduces the retransmission latency from 20 milliseconds to less than 1 millisecond).

In aspects, methods, devices, systems, and means for low-latency Bluetooth connectivity in a wireless network are described in which a peripheral node establishes a connection with a central node based on the low-latency profile. During a first connection interval, the peripheral node receives a packet from the central node to synchronize communication with the central node and, based on receiving the packet, transmits a first fixed-length packet. Based on transmitting the first fixed-length packet, the peripheral node awaits an acknowledgement (ACK) from the central node for a period of time during the first connection interval. Based on determining that the ACK was not received, the peripheral node retransmits the first fixed-length packet during the first connection interval.

In aspects, methods, devices, systems, and means for low-latency Bluetooth connectivity in a wireless network are described in which a central node establishes a connection with a peripheral node based on the low-latency profile. During a first connection interval, the central node transmits a packet to the peripheral node to synchronize communication with the peripheral node and, based on transmitting the packet, attempts to receive a first fixed-length packet from the peripheral node. If the first fixed-length packet is not received, the central node does not transmit an acknowledgement (ACK) to the peripheral node during the first connection interval, based on the not transmitting the ACK, receives the first fixed-length packet during the first connection interval, and transmits an acknowledgement (ACK) to the peripheral node indicating that the first fixed-length packet was received.

This summary is provided to introduce simplified concepts of low-latency Bluetooth connectivity, generally related to low-latency packet acknowledgements and retransmissions. The simplified concepts are further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of low-latency Bluetooth connectivity are described with reference to the following drawings. The same numbers are used throughout the drawings to reference like features and components.

DETAILED DESCRIPTION

Wireless technologies, such as Bluetooth®, Bluetooth® Low Energy (BLE), or the like, employ protocols to maintain connections between devices (e.g., to determine if a peripheral node (device) is connected to or disconnected from a central node (device)). These protocols may depend on the central node transmitting a packet to the peripheral node to synchronize communications and determine if the peripheral node is connected based on receiving a response packet from the peripheral node. The central node may limit the transmission of synchronizing packets to the peripheral node to once per connection interval to reduce power consumption. In the event that a response packet is lost (e.g., due to interference, poor link budget, or the like), the central node waits until the next connection interval to attempt to receive a second response packet from the peripheral device. The central node continues to attempt to receive the response packet over a number of connection intervals (e.g., three connection intervals) and then, to conserve power, increases the delay between reception attempts to multiples of the connection interval (e.g., attempts to receive every third connection interval).

The length of a connection interval is specified by the communication protocol standard to accommodate transmission of a maximum length packet (e.g., a 33 byte BLE packet) and can be renegotiated between the central node and the peripheral node to be any suitable length (e.g., from 7.5 milliseconds to 4 seconds in length) to accommodate one or more packets per connection interval. The central node depends on receiving a length field in the response packet to determine the length of the response packet. When the response packet is lost in transmission, the central node assumes that the peripheral node has not transmitted a data packet and holds transmission of a next synchronization packet until after the peripheral device would hypothetically complete transmitting a maximum length packet.

In some wireless systems after establishing a connection, the central node may only act as a receiver of data from the peripheral node and provide synchronization for communication between the central and peripheral nodes. For example, the central node may be a device such as a television, a set-top box, a media streaming device, or the like, and the peripheral node may be a device such as remote control that accepts user inputs and transmits the user inputs as commands to the central node. In such a system, the latency introduced by conventional techniques for synchronization, based on maximum packet sizes and retries with increasing latencies can affect the responsiveness a user perceives when using the remote control.

During connection establishment (pairing) between the central node and the peripheral node, the nodes can agree on a fixed packet length for communication that is shorter than the maximum packet length. For example, the central node and peripheral node agree that the peripheral node will transmit data packets with a Protocol Data Unit (PDU) length of eight bytes (or any other suitable length) instead of the maximum PDU length of 33 bytes.

As discussed in detail below, using a shorter, fixed length data packet reduces communication latency for retrying transmissions (thus, improving user-perceived responsiveness) when a packet transmitted by the peripheral node is lost in transmission and not received and acknowledged by the central node.

While features and concepts of the described systems and methods for low-latency Bluetooth connectivity can be implemented in any number of different environments, systems, devices, and/or various configurations, embodiments of low-latency Bluetooth connectivity are described in the context of the following example devices, systems, and configurations.

Example Environment

Figure 1:
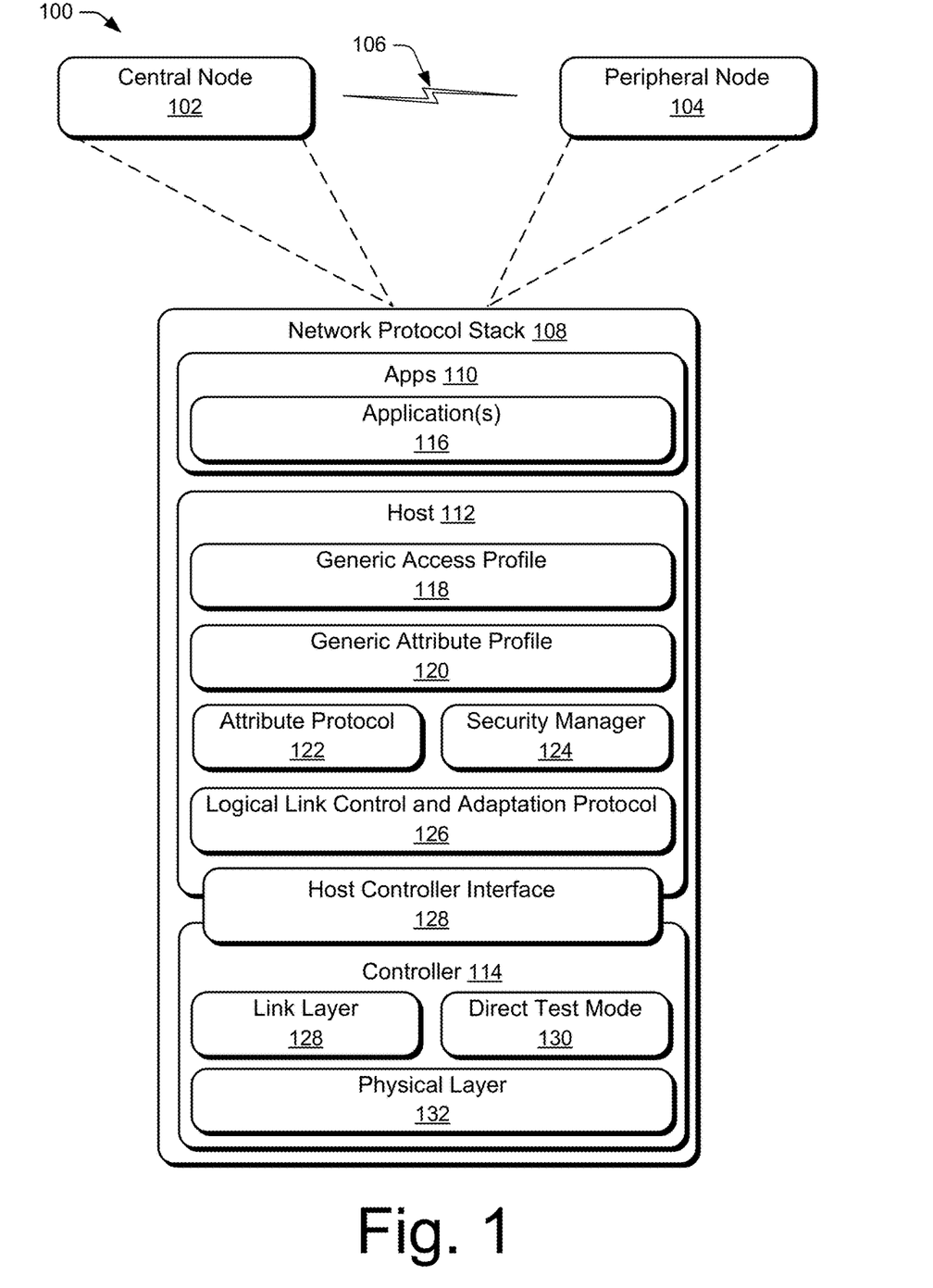
FIG. 1 illustrates an example wireless network system in which various embodiments of low-latency Bluetooth connectivity can be implemented.

FIG. 1 illustrates an example wireless network 100 in which various embodiments of low-latency Bluetooth connectivity can be implemented. The wireless network 100 includes a first wireless network device acting as a central node 102 and a second wireless network device acting as a peripheral node 104. The central node 102 and the peripheral node 104 are wireless network devices, as described below with respect to FIG. 7, which include a wireless network interface for communication over the wireless network 100. The central node 102 and the peripheral node 104 receive and transmit packet data over the wireless network, shown at 106, using the wireless network interface.

The central node 102 and the peripheral node 104 are BLE devices shown as including a network protocol stack 108 (BLE stack 108). The network protocol stack 108 includes three architectural blocks: Apps 110, Host 112, and Controller 114. The Apps 110 includes one or more applications 116 that use the lower layers of the network protocol stack 108 to communicate over the wireless network 100.

The Host 112 includes a Generic Access Profile 118 (GAP 118), a Generic Attribute Profile 120 (GATT 120), an Attribute Protocol 122 (ATT 122), a Security Manager 124 (SM 124), a Logical Link Control and Adaptation Protocol 126 (L2CAP 126), and the host-side portion of a Host Controller Interface 128 (HCI 128).

The Generic Access Profile 118 defines how BLE devices interact with each other, such as the roles of BLE devices (e.g., broadcaster role, observer role, central role, or peripheral role), advertisements (e.g., broadcasting, discovery, advertisement parameters, advertisement data), connection establishment (initiating connections, accepting connections, connection parameters), and security.

The Generic Attribute Profile 120 defines the format of the data exposed by a BLE device and the procedures to access the data exposed by a device (an attribute of the server). BLE devices can assume server and/or client GATT roles. In the server role, the device exposes the data that the device controls or contains and/or some aspects of the device's behavior that other devices can control. In the client role, the device interfaces with a server to read the server's exposed data and/or control the server device's behavior. GATT 120 attributes are data exposed by the server and the structure of the data. A GATT 120 service is a grouping of one or more attributes. GATT 120 characteristics are a part of a service that represents a piece of data exposed by the server. GATT 120 profiles more broadly define the behavior of both the client and server in terms of services, characteristics, connections and/or security requirements. The GATT 120 defines how the ATT 122 is employed to compose a service.

The Attribute Protocol 122 is a protocol layer that defines aspects of data transfer, such as identifying device discovery, and reading and writing attributes on a fellow device. The ATT 122 server stores attributes, and the ATT 122 client reads and writes server values. An ATT attribute includes a 16-bit handle, a universally unique identifier (UUID) that defines the attribute type, and a value.

The Security Manager 124 defines the rules and algorithms used to securely establish and maintain the security of communications links between BLE devices. The Logical Link Control and Adaptation Protocol 126 provides connection-oriented and connectionless data services to upper-layer protocols including protocol multiplexing, segmentation, and reassembly. The Host Controller Interface 128 is a protocol layer that allows the Host 112 to communicate with the Controller 114. For example, the Host 112 and the Controller 114 may be implemented on separate integrated circuits or the same integrated circuit.

The Controller 114 includes the controller-side portion of the HCI 128, a Link Layer 128 (LL 128), a Direct Test Mode 130, and a Physical Layer 132 (PHY 132). The Link Layer 128 interfaces with the Physical Layer 132 and provides an interface for upper protocol layers to interact with a BLE radio in the device. The LL 128 is responsible for managing the state and timing of the BLE radio. The Direct Test mode 130 provides test operations for the radio at the physical level. The Physical Layer 132 controls the operation of the physical radio used for communication, such as modulation, demodulation, tuning to a radio channel, or the like.

Figure 2:
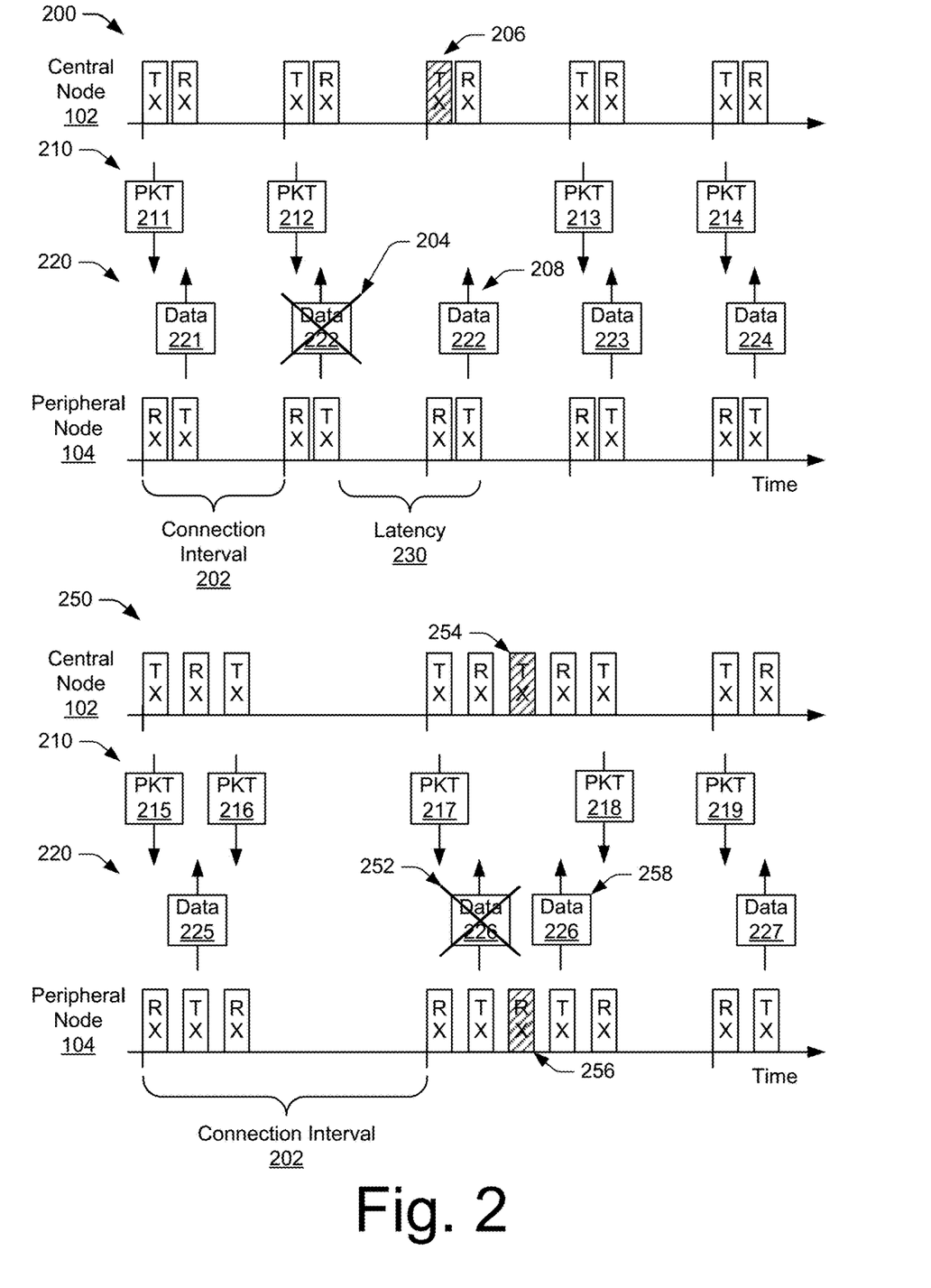
FIG. 2 illustrates an example of packets communicated in a wireless network in accordance with various embodiments of low-latency Bluetooth connectivity.

FIG. 2 illustrates an example of packets communicated in a wireless network in accordance with various embodiments of low-latency Bluetooth connectivity. FIG. 2 illustrates packets transmitted between the central node 102 and the peripheral node 104 in the wireless network 100, as shown and described with reference to FIG. 1.

At 200, communications (connection events) between the central node 102 and the peripheral node 104 occur during each connection interval 202 using a variable packet length as specified by the communication protocol standard where the connection interval is a time duration that accommodates the largest PDU specified by the BLE standard or a negotiated connection interval length (e.g., from 7.5 milliseconds to 4 seconds in length) that can accommodate one or more packets per connection interval. The central node 102 transmits packets 210 (PKT 210), illustrated as the packets 211, 212, 213, and 214, during a transmission (TX) interval at the beginning of each connection interval 202. The packets 210 provide synchronization of communications between the central node 102 and the peripheral node 104. The packets 210 can be any suitable packet, for example a BLE empty packet. The transmission of a packet 210 also provides acknowledgement of successful reception (RX) of a data packet 220 (illustrated as data packets 221, 222, 223, and 224) transmitted by the peripheral node 104 in a previous connection interval.

For example, the central node transmits PKT 211 to synchronize communication between the central node 102 and the peripheral node 104. Based on receiving the PKT 211, the peripheral node 104 transmits data packet 221. In the next connection interval, the central node 102 transmits the PKT 212 to acknowledge the successful reception of the data packet 221. Based on receiving the PKT 212, the peripheral node 104 transmits data packet 222. At 204, the data packet 222 fails to reach the central node 102 (e.g., due to interference, poor link budget, or the like). As a result of not receiving the data packet 222, the central node 102, at 206, does not transmit an acknowledgement to the peripheral device 104. At 208, in the next connection interval, the peripheral device 102 retransmits the data packet 222. In response to receiving the retransmitted data packet 222, the central node 102 transmits the PKT 213. The sequence of data packet transmissions and acknowledgements continues on in a similar manner as illustrated at 223, 214, and 224.

As noted above, the central node 102 and the peripheral node 104 communicate using a variable packet length as specified by the communication protocol standard. However, the data packets 220 are smaller than the maximum length allowed by the communication protocol standard. This results in a latency period 230 during which the peripheral device 102 must wait before attempting to retransmit the data packet 222.

At 250, communications between the central node 102 and the peripheral node 104 occur during each connection interval 202 using a low-latency profile that uses a fixed-length packet to reduce retry latency, the length being known by both the central node 102 and the peripheral node 104. The length of the packet is communicated between the peripheral node 104 and the central node 102 during connection establishment (pairing), as discussed below. In the illustrations 200 and 250, the connection interval 202 has the same time duration, but is illustrated with a larger scale at 250 for the sake of illustration clarity.

The central node 102 transmits packets 210, illustrated as the packets 215, 217, and 219, during a transmission (TX) interval at the beginning of each connection interval 202. The packets 215, 217, and 219 provide synchronization of communications between the central node 102 and the peripheral node 104. The transmission of a packet 216 or 218 also provides acknowledgement of successful reception (RX) of a data packet 220 (illustrated as data packets 225, 226, and 227) transmitted by the peripheral node 104 in a previous connection interval.

For example, the central node transmits PKT 215 to synchronize communication between the central node 102 and the peripheral node 104. Based on receiving the PKT 215, the peripheral node 104 transmits data packet 225. If the central node 102 receives the data packet 225, the central node transmits PKT 216 to acknowledge reception of the data packet 225. In the next connection interval, the central node 102 transmits the PKT 217 to synchronize communication between the central node 102 and the peripheral node 104. Based on receiving the PKT 217, the peripheral node 104 transmits data packet 226. At 252, the data packet 226 fails to reach the central node 102 (e.g., due to interference, poor link budget, or the like). Based on knowing the length of the fixed-length data packet 226, the central node 102 determines a time at which the data packet 226 should be received. Based on not receiving the data packet 226 as expected, the central node does not transmit an acknowledgment packet to the peripheral node at 254. Based on not receiving a packet from the central node during the reception window at 256, the peripheral node 104 infers that the central node 102 did not receive the data packet 226.

At 258, the peripheral device 102 retransmits the data packet 226. In response to receiving the retransmitted data packet 226, the central node 102 transmits the PKT 218. By retransmitting the lost data packet within a single connection interval, retry latency is reduced. The sequence of data packet transmissions and acknowledgements continues in a similar manner as illustrated at 219 and 227.

Figure 3:
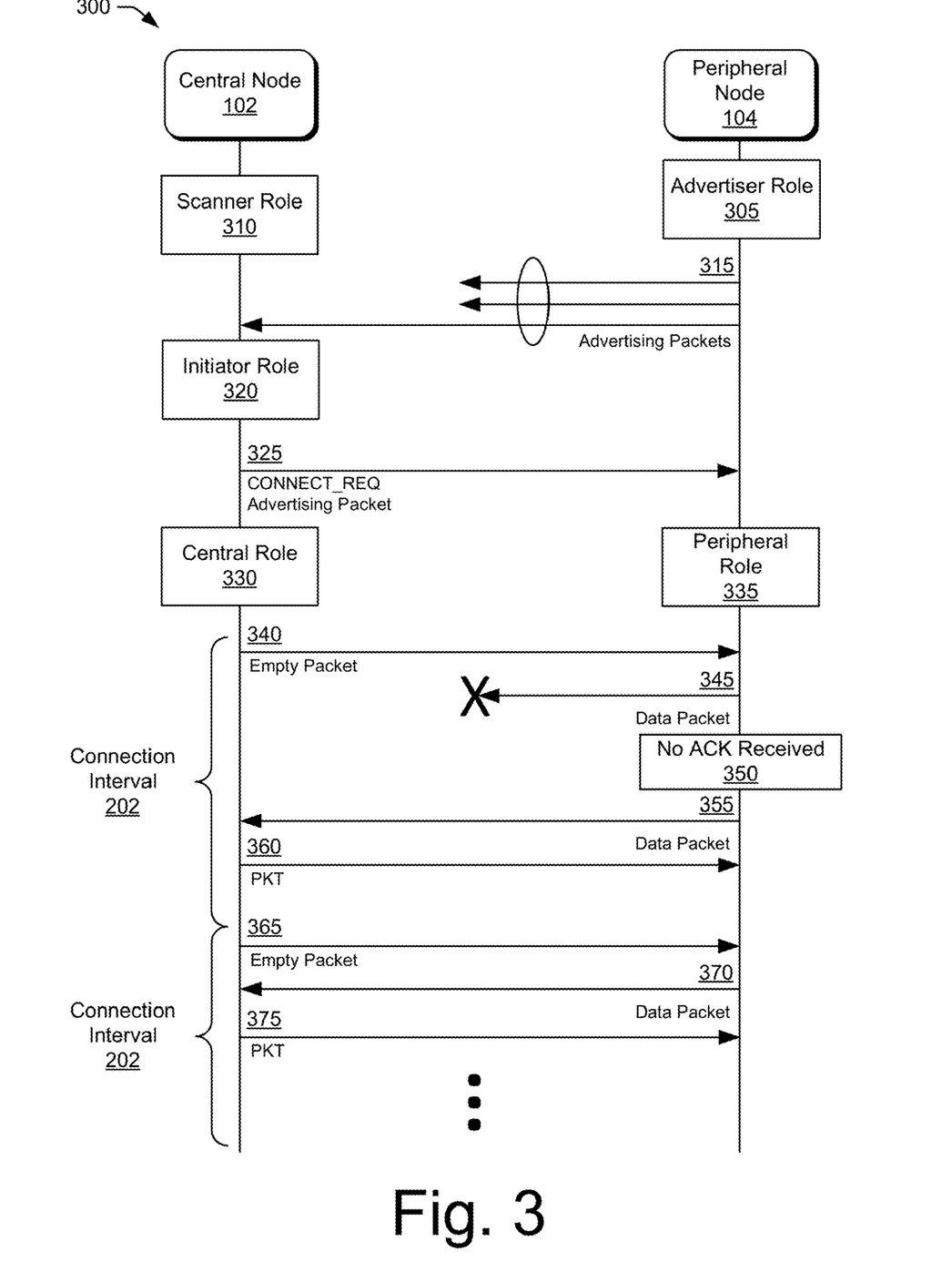
FIG. 3 illustrates example data and control transactions between a central node and a peripheral node in a wireless network in accordance with various embodiments of low-latency Bluetooth connectivity.

FIG. 3 illustrates example data and control transactions between the central node 102 and the peripheral node 104 in accordance with aspects of low-latency Bluetooth connectivity. To establish a connection, the peripheral node 104 enters the advertiser role, at 305, and the central node 102 enters the scanner role, at 310.

At 315, the peripheral node 104 transmits advertising packets on BLE advertising channels. The advertising packets include a UUID of the low-latency profile and low-latency-profile parameters. The low-latency-profile parameters include parameters specific to the low-latency profile including a length of the fixed-length packet, and/or a number of retries that the peripheral node can attempt to retransmit a packet during a connection interval.

At 320, after receiving an advertising packet for the connection and determining to establish the connection, the central node 102 transitions to the initiator role. At 325, the central node 102 transmits a CONNECT_REQ (connection request) packet to the peripheral node 104. The CONNECT_REQ packet includes a frequency hopping sequence for the connection, a maximum number of retransmissions per connection interval, a connection interval length (time), a peripheral latency that indicates the number of consecutive connection events to which the peripheral node 104 can skip listening to the central node or transmitting data, and a supervision timeout value. The CONNECT_REQ packet can also include the low-latency-profile parameters. The value of the low-latency profile parameters in the CONNECT_REQ packet may be those previously received from the peripheral node 104 in an advertising packet, or the central node 102 may select different values for one or more of the low-latency-profile parameters. Alternatively, (not illustrated in FIG. 3), the peripheral node 104 can request to change the value of connection parameters and the low-latency-profile parameters after the connection is established by transmitting a connection update packet to the central node 102.

After establishing the connection with the transmission of the CONNECT_REQ packet, the central node 102 transitions to the central role, at 330, and the peripheral node 104 transitions to the peripheral role, at 335. At 340, the central node 102 initiates a first connection event by transmitting an empty packet to synchronize communications between the central node 102 and the peripheral node 104.

Based on receiving the empty packet at 340, the peripheral node transmits a fixed-length packet data packet, at 345. In this case, the data packet does not reach the central node 102. Based on knowing the length of the expected fixed-length packet, at 350, the central node determines that no communication was received and does not transmit a packet to acknowledge the missing transmission.

Based on receiving not receiving an acknowledgement, at 350, the peripheral node 104 retransmits the fixed-length data packet at 355. The central node 102 receives the retransmitted fixed-length data packet at 355 and sends an acknowledgement packet at 360.

At 365, in the next connection interval 202, the central node 102 transmits an empty packet to synchronize communications. Based on receiving the packet at 365, the peripheral node 104 transmits another fixed-length data packet at 370. Based on receiving the fixed-length data packet at 370, the central node 102 transmits a packet to acknowledge the received data packet, at 375. The communication of fixed-length data packets and corresponding acknowledgement packets can continue as long as the peripheral node 104 has data to transmit or until the peripheral node 104 exceeds the peripheral latency time without transmitting a data packet, at which point the connection between the central node 102 and the peripheral node 104 terminates.

Example Methods

Example methods 400 and 500 are described with reference to respective FIGS. 4 and 5 in accordance with one or more embodiments of low-latency Bluetooth connectivity. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
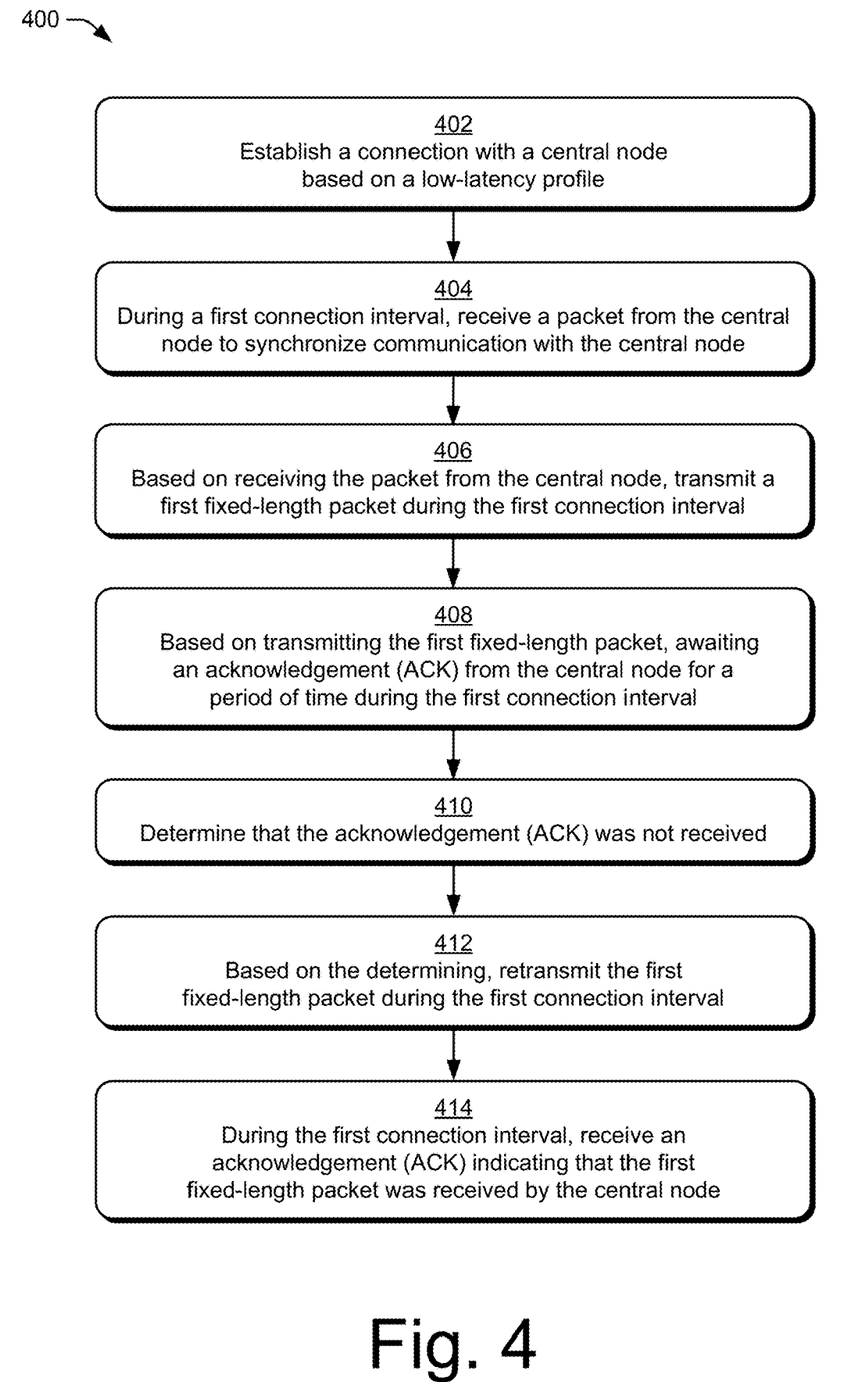
FIG. 4 illustrates an example method of low-latency Bluetooth connectivity as generally related to a peripheral node in accordance with embodiments of the techniques described herein.

FIG. 4 illustrates example method(s) 400 of low-latency Bluetooth connectivity as generally related to a peripheral node in a wireless network. At block 402, a peripheral node establishes a connection with a central node based on a low-latency profile. For example, a peripheral node (e.g., the peripheral node 104) establishes a connection with a central node (e.g., the central node 102) based on a low-latency profile by transmitting advertising packets that include low-latency-profile parameters on BLE advertising channels 37, 38, and 39 that include a UUID of the low-latency profile.

At block 404, during a first connection interval, the peripheral node receives a packet from the central node to synchronize communication with the central node. For example, the peripheral node receives an empty packet from the central node to synchronize communication during the first communication interval.

At block 406, based on receiving the packet from the central node, the peripheral node transmits a first fixed-length packet during the first connection interval. For example, after receiving the empty packet from the central node, the peripheral node transmits a first fixed-length packet after a receive-to-transmit turnaround time (e.g., a BLE Interframe space time, $T_{IFS}$, of 150 microseconds).

At block 408, based on transmitting the first fixed-length packet, the peripheral node awaits an acknowledgement (ACK) from the central node for a period of time during the first connection interval. For example, after transmitting the first fixed-length packet, the peripheral node activates its receiver after a transmit-to-receive turnaround time (e.g., the BLE $T_{IFS}$) for a period of time in order to receive an ACK from the central node.

At block 410, the peripheral node determines that the ACK was not received. For example, if the first-fixed-length packet was not received by the central node, the peripheral node does not receive an ACK transmitted by the central node during the period of time that the peripheral node has activated its receiver.

At block 412, based on the determining, the peripheral node retransmits the first fixed-length packet during the first connection interval. For example, after not receiving the ACK from the central node, the peripheral node retransmits the first fixed-length packet after a receive-to-transmit turnaround time, during the first connection interval.

At block 414, the peripheral node receives an acknowledgement (ACK) indicating that the first fixed-length packet was received by the central node during the first connection interval. For example, based on retransmitting the first fixed-length packet during the first connection interval, the peripheral node receives an ACK during the first connection interval indicating that the first fixed-length packet was received by the central node.

Figure 5:
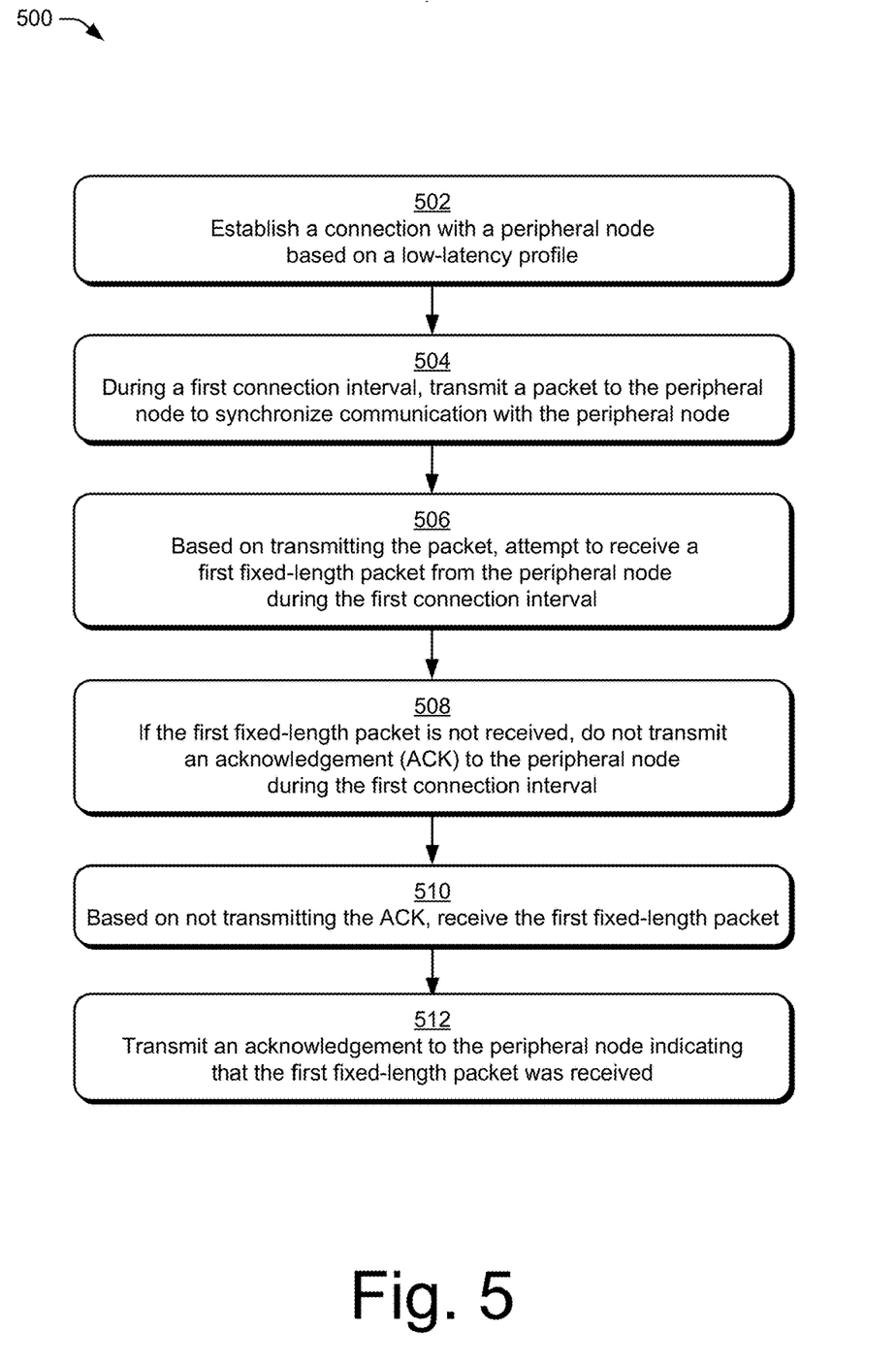
FIG. 5 illustrates another example method of low-latency Bluetooth connectivity as generally related to a central node in accordance with embodiments of the techniques described herein.

FIG. 5 illustrates example method(s) 500 of low-latency Bluetooth connectivity as generally related to a central node in a wireless network. At block 502, a central node establishes a connection with a peripheral node based on a low-latency profile. For example, the central node (e.g., the central node 102) establishes a connection with a peripheral node (e.g., the peripheral node 104). The central node enters a scanner role and receives an advertising packet that includes the UUID of the low-latency profile. Based on receiving the advertising packet, the central node transmits a CONNECT_REQ advertising packet including connection parameters and low-latency-profile parameters to establish the connection.

At block 504, during a first connection interval, the central node transmits a packet to the peripheral node to synchronize communication with the peripheral node. For example, the central node transmits a BLE empty packet at the beginning of the first connection interval to synchronize communications between the central node and the peripheral node.

At block 506, based on transmitting the packet, the central node attempts to receive a first fixed-length packet from the peripheral node during the first connection interval. For example, the central node determines when to expect to receive the first fixed-length packet based on the length of the fixed-length packet communicated during the establishment of the connection and a receive-to-transmit turnaround time that is common to the central node and the peripheral node.

At block 508, if the first fixed-length packet is not received, the central node does not transmit an acknowledgement (ACK) to the peripheral node during the first connection interval. For example, if the central node does not receive the first fixed-length packet, the central node does not transmit an ACK to the peripheral node during the first connection interval.

At block 510, based on not transmitting the ACK, the central node receives the first fixed-length packet. For example, after a transmit-to-receive turnaround time ($T_{IFS}$) following the unused transmission window for an ACK, the central node activates its receiver to attempt to receive a retransmission of the first fixed-length packet. Based on receiving the retransmission of the first fixed-length packet, the central node transmits an acknowledgement (ACK).

At block 512, the central node transmits an acknowledgement to the peripheral node indicating that the first fixed-length packet was received. For example, after a receive-to-transmit turnaround time, the central node transmits an acknowledgement to the peripheral node indicating that the retransmitted first fixed-length packet was received.

Example Environment

Figure 6:
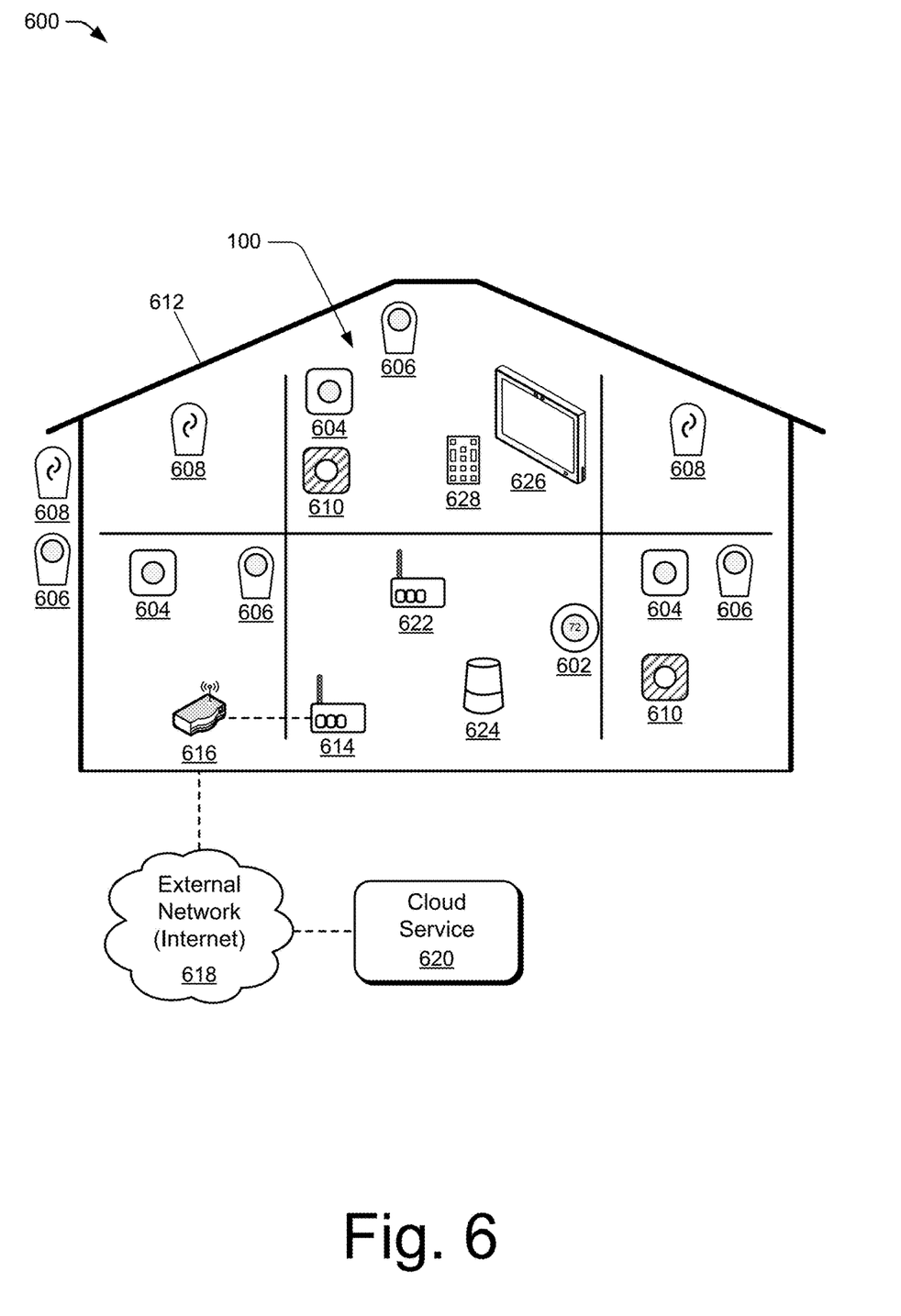
FIG. 6 illustrates an example environment in which a wireless network can be implemented in accordance with embodiments of the techniques described herein.

FIG. 6 illustrates an example environment 600 in which the wireless network 100 (as described with reference to FIG. 1), and embodiments of low-latency Bluetooth connectivity can be implemented. Generally, the environment 600 includes the wireless network 100, implemented as part of a home area network or other type of structure with any number and type of wireless network devices that are configured for communication in a wireless network, such a wireless network with a star, mesh, or other topology. For example, the wireless network devices can include a thermostat 602, hazard detectors 604 (e.g., for smoke and/or carbon monoxide), cameras 606 (e.g., indoor and outdoor), lighting units 608 (e.g., indoor and outdoor), and any other types of wireless network devices 610 that are implemented inside and/or outside of a structure 612 (e.g., in a home area network environment). In this example, the wireless network devices can also include any of the previously described devices, such as a central node 102 or a peripheral node 104.

In the environment 600, any number of the wireless network devices can be implemented for wireless interconnection to wirelessly communicate and interact with each other. The wireless network devices are modular, intelligent, multi-sensing, network-connected devices, which can integrate seamlessly with each other and/or with a central server or a cloud-computing system to provide any of a variety of useful objectives and implementations. An example of a wireless network device that can be implemented as any of the devices described herein is shown and described with reference to FIG. 7.

In implementations, the thermostat 602 may include a Nest® Learning Thermostat that detects ambient climate characteristics (e.g., temperature and/or humidity) and controls a HVAC system in the home area network environment. The learning thermostat 602 and other devices "learn" by capturing occupant settings to the devices. For example, the thermostat learns preferred temperature set-points for mornings and evenings, and when the occupants of the structure are asleep or awake, as well as when the occupants are typically away or at home.

A hazard detector 604 can be implemented to detect the presence of a hazardous substance or a substance indicative of a hazardous substance (e.g., smoke, fire, or carbon monoxide). In examples of wireless interconnection, a hazard detector 604 may detect the presence of smoke, indicating a fire in the structure, in which case the hazard detector that first detects the smoke can broadcast a low-power wake-up signal to all of the connected wireless network devices. The other hazard detectors 604 can then receive the broadcast wake-up signal and initiate a high-power state for hazard detection and to receive wireless communications of alert messages. Further, the lighting units 608 can receive the broadcast wake-up signal and activate in the region of the detected hazard to illuminate and identify the problem area. In another example, the lighting units 608 may activate in one illumination color to indicate a problem area or region in the structure, such as for a detected fire or break-in, and activate in a different illumination color to indicate safe regions and/or escape routes out of the structure. In another example, a doorbell or door monitoring system may include LEDs that flash yellow (or other color) when a presence is detected, or flash red if an alarm is activated.

In various configurations, the wireless network devices 610 can include an entryway interface device that functions in coordination with a network-connected door lock system, and that detects and responds to a person's approach to or departure from a location, such as an outer door of the structure 612. The entryway interface device can interact with the other wireless network devices based on whether someone has approached or entered the home area network environment. An entryway interface device can control doorbell functionality, announce the approach or departure of a person via audio or visual means, and control settings on a security system, such as to activate or deactivate the security system when occupants come and go. The wireless network devices 610 can also include other sensors and detectors, such as to detect ambient lighting conditions, detect room-occupancy states (e.g., with an occupancy sensor), and control a power and/or dim state of one or more lights. In some instances, the sensors and/or detectors may also control a power state or speed of a fan, such as a ceiling fan. Further, the sensors and/or detectors may detect occupancy in a room or enclosure and control the supply of power to electrical outlets or devices, such as if a room or the structure is unoccupied.

The wireless network devices 610 may also include connected appliances and/or controlled systems, such as refrigerators, stoves and ovens, washers, dryers, air conditioners, pool heaters, irrigation systems, security systems, and so forth, as well as other electronic and computing devices, such as televisions, entertainment systems, computers, intercom systems, garage-door openers, ceiling fans, control panels, and the like. When plugged in, an appliance, device, or system can announce itself to the wireless network as described above and can be automatically integrated with the controls and devices of the wireless network, such as in the home area network. It should be noted that the wireless network devices 610 may include devices physically located outside of the structure, but within wireless communication range, such as a device controlling a swimming pool heater or an irrigation system.

The wireless network 100 may include a border router 614 that interfaces for communication with an external network, outside the wireless network 100. The border router 614 connects to an access point 616, which connects to a communication network 618, such as the Internet. A cloud service 620, which is connected via the communication network 618, provides services related to and/or using the devices within the wireless network 100. By way of example, the cloud service 620 can include applications for connecting end user devices, such as smartphones, tablets, and the like, to devices in the wireless network, processing and presenting data acquired in the wireless network 100 to end users, linking devices in one or more wireless networks 100 to user accounts of the cloud service 620, provisioning and updating devices in the wireless network 100, and so forth. For example, a user can control the thermostat 602 and other wireless network devices in the home environment using a network-connected computer or portable device, such as a mobile phone or tablet device. Further, the wireless network devices can communicate information to any central server or cloud-computing system via the border router 614 and the access point 616. The data communications can be carried out using any of a variety of custom or standard wireless protocols (e.g., Wi-Fi, ZigBee for low power, BLE, 6LoWPAN, etc.) and/or by using any of a variety of custom or standard wired protocols (CAT6 Ethernet, HomePlug, etc.).

Any of the wireless network devices in the wireless network 100 can serve as low-power and communication nodes to create the wireless network 100 in the home area network environment. Individual low-power nodes of the network can regularly send out messages regarding what they are sensing, and the other low-powered nodes in the environment—in addition to sending out their own messages—can repeat the messages, thereby communicating the messages from node to node (e.g., from device to device) throughout the wireless network. The wireless network devices can be implemented to conserve power, particularly when battery-powered, utilizing low-powered communication protocols to receive the messages, translate the messages to other communication protocols, and send the translated messages to other nodes and/or to a central server or cloud-computing system. For example, an occupancy and/or ambient light sensor can detect an occupant in a room as well as measure the ambient light and activate the light source when the ambient light sensor detects that the room is dark and when the occupancy sensor detects that someone is in the room. Further, the sensor can include a low-power wireless communication chip (e.g., a ZigBee chip, a Bluetooth chip, a BLE chip, and so forth) that regularly sends out messages regarding the occupancy of the room and the amount of light in the room, including instantaneous messages coincident with the occupancy sensor detecting the presence of a person in the room. As mentioned above, these messages may be sent wirelessly, using the wireless network, from node to node (i.e., device to device) within the home area network environment as well as over the Internet to a central server or cloud-computing system.

In other configurations, various ones of the wireless network devices can function as "tripwires" for an alarm system in the home area network environment. For example, in the event a perpetrator circumvents detection by alarm sensors located at windows, doors, and other entry points of the structure or environment, the alarm could still be triggered by receiving an occupancy, motion, heat, sound, etc. message from one or more of the low-powered wireless nodes in the wireless network. In other implementations, the wireless network can be used to automatically turn on and off the lighting units 608 as a person transitions from room to room in the structure. For example, the wireless network devices can detect the person's movement through the structure and communicate corresponding messages via the nodes of the wireless network. Using the messages that indicate which rooms are occupied, other wireless network devices that receive the messages can activate and/or deactivate accordingly. As referred to above, the wireless network can also be utilized to provide exit lighting in the event of an emergency, such as by turning on the appropriate lighting units 608 that lead to a safe exit. The light units 608 may also be turned-on to indicate the direction along an exit route that a person should travel to safely exit the structure.

The various wireless network devices may also be implemented to integrate and communicate with wearable computing devices, such as may be used to identify and locate an occupant of the structure, and adjust the temperature, lighting, sound system, and the like accordingly. In other implementations, RFID sensing (e.g., a person having an RFID bracelet, necklace, or key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., a person wearing an infrared or NFC-capable smartphone), along with rules-based inference engines or artificial intelligence techniques that draw useful conclusions from the sensed information as to the location of an occupant in the structure or environment.

In other implementations, personal comfort-area networks, personal health-area networks, personal safety-area networks, and/or other such human-facing functionalities of service robots can be enhanced by logical integration with other wireless network devices and sensors in the environment according to rules-based inferencing techniques or artificial intelligence techniques for achieving better performance of these functionalities. In an example relating to a personal health-area, the system can detect whether a household pet is moving toward the current location of an occupant (e.g., using any of the wireless network devices and sensors), along with rules-based inferencing and artificial intelligence techniques. Similarly, a hazard detector service robot can be notified that the temperature and humidity levels are rising in a kitchen, and temporarily raise a hazard detection threshold, such as a smoke detection threshold, under an inference that any small increases in ambient smoke levels will most likely be due to cooking activity and not due to a genuinely hazardous condition. Any service robot that is configured for any type of monitoring, detecting, and/or servicing can be implemented as a wireless node device on the wireless network, conforming to the wireless interconnection protocols for communicating on the wireless network.

The wireless network devices 610 may also include an alarm clock for each of the individual occupants of the structure in the home area network environment. For example, an occupant can customize and set an alarm device for a wake time, such as for the next day or week. Artificial intelligence can be used to consider occupant responses to the alarms when they go off and make inferences about preferred sleep patterns over time. An individual occupant can then be tracked in the wireless network based on a unique signature of the person, which is determined based on data obtained from sensors located in the wireless network devices, such as sensors that include ultrasonic sensors, passive IR sensors, and the like. The unique signature of an occupant can be based on a combination of patterns of movement, voice, height, size, etc., as well as using facial recognition techniques.

In an example of wireless interconnection, the wake time for an individual can be associated with the thermostat 602 to control the HVAC system in an efficient manner so as to pre-heat or cool the structure to desired sleeping and awake temperature settings. The preferred settings can be learned over time, such as by capturing the temperatures set in the thermostat before the person goes to sleep and upon waking up. Collected data may also include biometric indications of a person, such as breathing patterns, heart rate, movement, etc., from which inferences are made based on this data in combination with data that indicates when the person actually wakes up. Other wireless network devices can use the data to provide other automation objectives, such as adjusting the thermostat 602 so as to pre-heat or cool the environment to a desired setting and turning-on or turning-off the lights 608.

In implementations, the wireless network devices can also be utilized for sound, vibration, and/or motion sensing such as to detect running water and determine inferences about water usage in a home area network environment based on algorithms and mapping of the water usage and consumption. This can be used to determine a signature or fingerprint of each water source in the home and is also referred to as "audio fingerprinting water usage." Similarly, the wireless network devices can be utilized to detect the subtle sound, vibration, and/or motion of unwanted pests, such as mice and other rodents, as well as by termites, cockroaches, and other insects. The system can then notify an occupant of the suspected pests in the environment, such as with warning messages to help facilitate early detection and prevention.

The environment 600 may include one or more wireless network devices that function as a hub 622. The hub 622 may be a general-purpose home automation hub, or an application-specific hub, such as a security hub, an energy management hub, an HVAC hub, and so forth. The functionality of a hub 622 may also be integrated into any wireless network device, such as a thermostat device or the border router 614. Hosting functionality on the hub 622 in the structure 612 can improve reliability when the user's internet connection is unreliable, can reduce latency of operations that would normally have to connect to the cloud service 620, and can satisfy system and regulatory constraints around local access between wireless network devices.

Additionally, the example environment 600 includes a network-connected speaker 624. The network-connected speaker 624 provides voice assistant services that include providing voice control of home area network devices. The functions of the hub 622 may be hosted in the network-connected speaker 624. The network-connected speaker 624 can be configured to communicate via the wireless network, Wi-Fi, or both.

Further, the example environment 600 includes a television 626 and an associated remote control 628. The television 626 includes a television, network-connected television, a television connected to a network-connected media streaming device and/or standalone network connected media streaming device. The television 626 can be implemented as a central node 102 for the remote control 628 that can be implemented as a peripheral node 104 as described above.

Example Device

Figure 7:
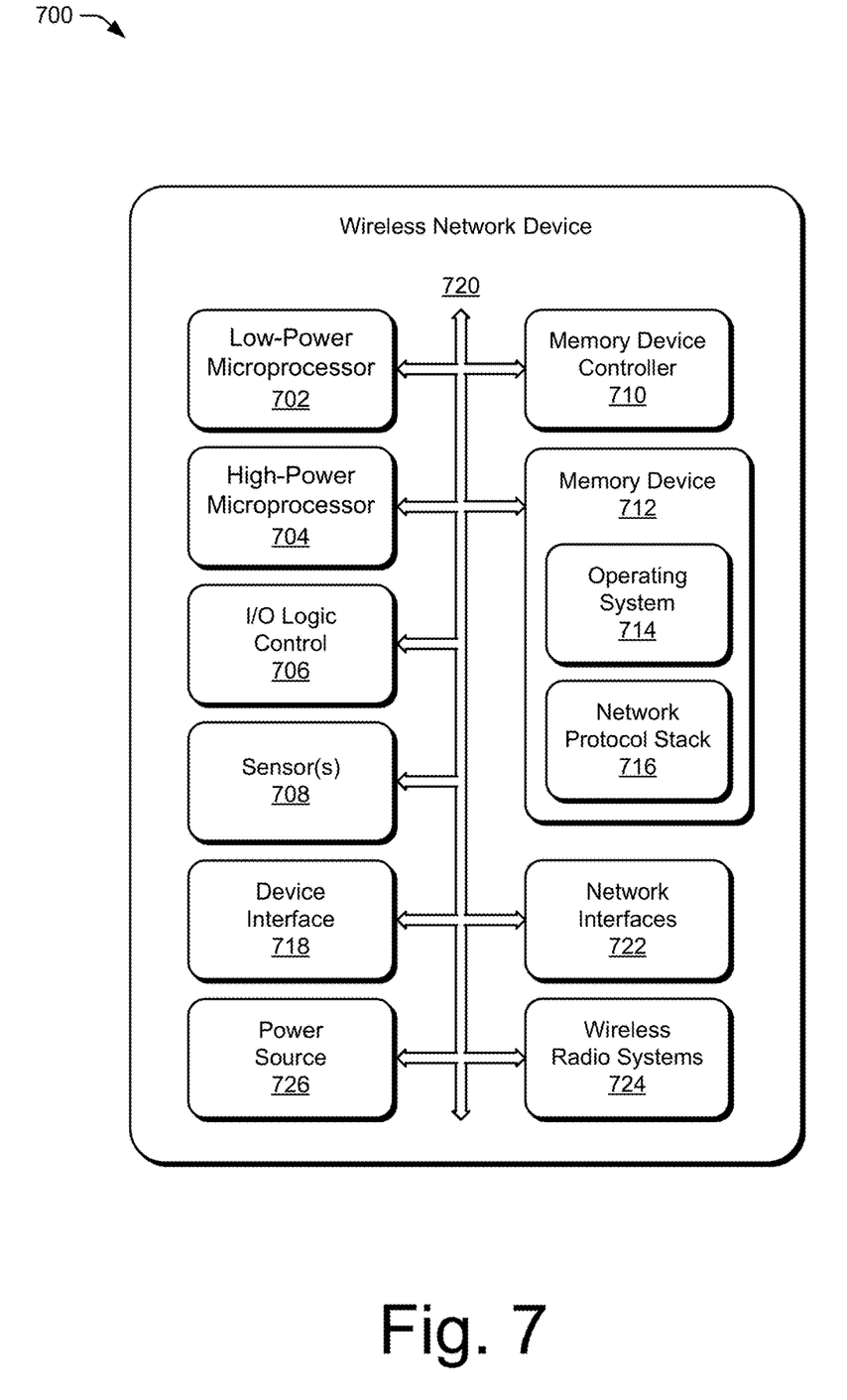
FIG. 7 illustrates an example wireless network device that can be implemented in a wireless network environment in accordance with one or more embodiments of the techniques described herein.

FIG. 7 illustrates an example wireless network device 700 that can be implemented as any of the wireless network devices in a wireless network in accordance with one or more embodiments of low-latency Bluetooth connectivity as described herein, such as the central node 102 or the peripheral node 104. The device 700 can be integrated with electronic circuitry, microprocessors, memory, input output (I/O) logic control, communication interfaces and components, as well as other hardware, firmware, and/or software to implement the device in a wireless network.

In this example, the wireless network device 700 includes a low-power microprocessor 702 and a high-power microprocessor 704 (e.g., microcontrollers or digital signal processors) that process executable instructions. The device also includes an input-output (I/O) logic control 706 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The low-power microprocessor 702 and the high-power microprocessor 704 can also support one or more different device functionalities of the device. For example, the high-power microprocessor 704 may execute computationally intensive operations, whereas the low-power microprocessor 702 may manage less complex processes such as detecting a hazard or temperature from one or more sensors 708. The low-power processor 702 may also wake or initialize the high-power processor 704 for computationally intensive processes.

The one or more sensors 708 can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 708 may include any one or a combination of temperature sensors, humidity sensors, hazard-related sensors, other environmental sensors, accelerometers, microphones, optical sensors up to and including cameras (e.g., charged coupled-device or video cameras, active or passive radiation sensors, GPS receivers, and radio frequency identification detectors. In implementations, the wireless network device 700 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or automation objectives.

The wireless network device 700 includes a memory device controller 710 and a memory device 712, such as any type of a nonvolatile memory and/or other suitable electronic data storage device. The wireless network device 700 can also include various firmware and/or software, such as an operating system 714 that is maintained as computer executable instructions by the memory and executed by a microprocessor. The device software may also include a network protocol stack 716 that implements embodiments of low-latency Bluetooth connectivity. The wireless network device 700 also includes a device interface 718 to interface with another device or peripheral component and includes an integrated data bus 720 that couples the various components of the wireless network device for data communication between the components. The data bus in the wireless network device may also be implemented as any one or a combination of different bus structures and/or bus architectures.

The device interface 718 may receive input from a user and/or provide information to the user (e.g., as a user interface), and a received input can be used to determine a setting. The device interface 718 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 718 may also receive inputs from any number of peripherals, such as buttons, a keypad, a switch, a microphone, and an imager (e.g., a camera device).

The wireless network device 700 can include network interfaces 722, such as a wireless network interface for communication with other wireless network devices in a wireless network, and an external network interface for network communication, such as via the Internet. The wireless network device 700 also includes wireless radio systems 724 for wireless communication with other wireless network devices via the wireless network interface and for multiple, different wireless communications systems. The wireless radio systems 724 may include Wi-Fi, Bluetooth™, Mobile Broadband, BLE, and/or point-to-point IEEE 802.15.4. Each of the different radio systems can include a radio device, antenna, and chipset that is implemented for a particular wireless communications technology. The wireless network device 700 also includes a power source 726, such as a battery and/or to connect the device to line voltage. An AC power source may also be used to charge the battery of the device.

In the following text some examples are described:

Example 1: A method for communication in a wireless communication system using a low-latency profile, the method comprising a peripheral node:
  establishing a connection with a central node based on the low-latency profile;
  during a first connection interval:
    receiving a packet from the central node to synchronize communication with the central node;
    based on the receiving the packet, transmitting a first fixed-length packet;
    based on the transmitting the first fixed-length packet, awaiting an acknowledgement (ACK) from the central node for a period of time;
    determining that the acknowledgement (ACK) was not received;
    based on the determining, retransmitting the first fixed-length packet; and
    receiving an acknowledgement (ACK) during the first connection interval, indicating that the first fixed-length packet was received by the central node.

Example 2: The method of example 1, wherein the establishing the connection with a central node comprises the peripheral node:
  entering an advertiser role;
  transmitting advertising packets that include low-latency-profile parameters, the transmitting causing the central node to initiate a connection;
  receiving, from the central node, a CONNECT_REQ advertising packet including connection parameters; and
  based on the receiving, transitioning to a peripheral role to communicate with the central node using the established connection.

Example 3: The method of example 2, wherein the low-latency-profile parameters include:
  a universally unique identifier (UUID) of the low-latency profile.

Example 4: The method of example 2, wherein the low-latency-profile parameters include:
  a length of fixed-length packets transmitted by the peripheral node.

Example 5: The method of example 2, wherein connection parameters included in the CONNECT_REQ advertising packet include:
  a length of fixed-length packets transmitted by the peripheral node;
  a maximum number of retransmissions per connection interval;
  a frequency hopping sequence for the connection;
  a connection interval length;
  a peripheral latency; and
  a supervision timeout value.

Example 6: The method of example 4 or example 5, further comprising the peripheral node:
  based on the length of the fixed-length packets, determining a first time at which to activate a receiver to attempt to receive the acknowledgement from the central node and a second time at which to retransmit the first fixed-length packet.

Example 7: The method of any one of the preceding examples, wherein the wireless communication system is a Bluetooth Low Energy (BLE) wireless communication system, and wherein the low-latency profile is a BLE Generic Attribute (GATT) profile.

Example 8: A method for communication in a wireless communication system using a low-latency profile, the method comprising a central node:
  establishing a connection with a peripheral node based on the low-latency profile;
  during a first connection interval:
    transmitting a packet to the peripheral node to synchronize communication with the peripheral node;
    based on the transmitting the packet, attempting to receive a first fixed-length packet from the peripheral node;
    if the first fixed-length packet is not received, not transmitting an acknowledgement (ACK) to the peripheral node;
    based on the not transmitting the ACK, receiving the first fixed-length packet; and
    transmitting an acknowledgement (ACK) to the peripheral node indicating that the first fixed-length packet was received.

Example 9: The method of example 8, wherein the establishing the connection with the peripheral node comprises the central node:
  entering a scanner role;

receiving an advertising packet that includes low-latency-profile parameters;

based on the receiving, determining to establish a connection with the peripheral node;

transmitting, to the peripheral node, a CONNECT_REQ advertising packet including connection parameters to establish the connection; and based on the transmitting, transitioning to a central role to communicate with the peripheral node using the established connection.

Example 10: The method of example 9, wherein the low-latency-profile parameters include a universally unique identifier (UUID) of the low-latency profile; and wherein the determining to establish the connection with the peripheral node comprises:

determining to establish the connection with the peripheral node based at least in part on the UUID of the low-latency profile.

Example 11: The method of example 9, wherein the low-latency-profile parameters include:

a length of fixed-length packets transmitted by the peripheral node.

Example 12: The method of example 9, wherein the connection parameters included in the CONNECT_REQ advertising packet include:

a length of fixed-length packets transmitted by the peripheral node;

a maximum number of retransmissions per connection interval;

a frequency hopping sequence for the connection;

a connection interval length;

a peripheral latency; and a supervision timeout value.

Example 13: The method of example 11 or example 12, further comprising the central node:

based on the length of the fixed-length packets, determining a first time at which to activate a receiver to attempt to receive the first fixed-length packet and a second time at which to activate a receiver to attempt to receive a retransmission of the first fixed-length packet.

Example 14: The method of any one of examples 8 to 13, wherein the wireless communication system is a Bluetooth Low Energy (BLE) wireless communication system, and wherein the low-latency profile is a BLE Generic Attribute (GATT) profile.

Example 15: The method of any one of examples 8 to 13, wherein if the first fixed-length packet is received, the method comprises the central node:

transmitting an acknowledgement (ACK) to the peripheral node for the first fixed length packet.

Example 16: A wireless network device comprising:

a wireless network interface;

a processor; and a memory comprising a network protocol stack configured to perform any one of examples 1 to 15.

Example 17: A wireless network device of example 16, wherein the wireless network device is:

a thermostat;

a hazard detector;

a camera;

a lighting unit;

an entryway interface;

a door lock;

an occupancy sensor;

a ceiling fan;

an electrical outlet;

a security sensor;

a security hub;

a garage door opener;

a control panel;

a border router;

a hub;

a network-connected speaker;

a television;

a remote control;

a network-connected television;

a network-connected media streaming device; or any combination thereof.

Although embodiments of low-latency Bluetooth connectivity have been described in language specific to features and/or methods, the subject of the appended claims is not necessarily limited to the specific features or methods described. Rather, the specific features and methods are disclosed as example implementations of low-latency Bluetooth connectivity, and other equivalent features and methods are intended to be within the scope of the appended claims. Further, various different embodiments are described, and it is to be appreciated that each described embodiment can be implemented independently or in connection with one or more other described embodiments.

The invention claimed is:

1. A method for communication in a wireless communication system using a low-latency profile, the method comprising a peripheral node:

establishing a connection with a central node based on the low-latency profile including:

receiving, from the central node, a CONNECT_REQ advertising packet including connection parameters; and based on the receiving, transitioning to a peripheral role to communicate with the central node using the established connection;

during a first connection interval:

receiving a packet from the central node to synchronize communication with the central node;

based on the receiving the packet, transmitting a first fixed-length packet;

based on the transmitting the first fixed-length packet, awaiting an acknowledgement (ACK) from the central node for a period of time;

determining that the acknowledgement (ACK) was not received;

based on the determining, retransmitting the first fixed-length packet; and receiving an acknowledgement (ACK) during the first connection interval, indicating that the first fixed-length packet was received by the central node.

2. The method of claim 1, wherein the establishing the connection with a central node comprises the peripheral node:

entering an advertiser role; and transmitting advertising packets that include low-latency-profile parameters, the transmitting causing the central node to initiate a connection.

3. The method of claim 2, wherein the low-latency-profile parameters include:

a universally unique identifier (UUID) of the low-latency profile.

4. The method of claim 2, wherein the low-latency-profile parameters include:

a length of fixed-length packets transmitted by the peripheral node.

5. The method of claim 4, further comprising the peripheral node:

based on the length of the fixed-length packets, determining a first time at which to activate a receiver to attempt to receive the acknowledgement from the central node and a second time at which to retransmit the first fixed-length packet.

6. The method of claim 1, wherein the connection parameters included in the CONNECT_REQ advertising packet include:
 a length of fixed-length packets transmitted by the peripheral node;
 a maximum number of retransmissions per connection interval;
 a frequency hopping sequence for the connection;
 a connection interval length;
 a peripheral latency; and
 a supervision timeout value.

7. The method of claim 1, wherein the wireless communication system is a Bluetooth Low Energy (BLE) wireless communication system, and wherein the low-latency profile is a BLE Generic Attribute (GATT) profile.

8. A wireless network device comprising:
 a wireless network interface;
 a processor; and
 a memory comprising a network protocol stack configured to:
  establish a connection with a central node based on a low-latency profile, the establishment of the connection with the central node further configures the network protocol stack to:
   receive, from the central node, a CONNECT_REQ advertising packet including connection parameters; and
   based on the reception, transition to a peripheral role to communicate with the central node using the established connection;
  during a first connection interval:
   receive a packet from the central node to synchronize communication with the central node;
   based on the reception of the packet, transmit a first fixed-length packet;
   based on the transmission of the first fixed-length packet, await an acknowledgement (ACK) from the central node for a period of time;
   determine that the acknowledgement (ACK) was not received;
   based on the determination, retransmit the first fixed-length packet; and
   receive an acknowledgement (ACK) during the first connection interval, indicating that the first fixed-length packet was received by the central node.

9. The wireless network device of claim 8, wherein the establishment of the connection with a central node further configures the network protocol stack to:
 enter an advertiser role; and
 transmit advertising packets that include low-latency-profile parameters, the transmission causing the central node to initiate a connection.

10. The wireless network device of claim 9, wherein the low-latency-profile parameters include:
 a universally unique identifier (UUID) of the low-latency profile.

11. The wireless network device of claim 10, wherein the network protocol stack is configured to:
 based on the length of the fixed-length packets, determine a first time at which to activate a receiver to attempt to receive the acknowledgement from the central node and a second time at which to retransmit the first fixed-length packet.

12. The wireless network device of claim 9, wherein the low-latency-profile parameters include:
 a length of fixed-length packets transmitted by the wireless network device in the peripheral role.

13. The wireless network device of claim 8, wherein the wireless network device is:
 a thermostat;
 a hazard detector;
 a camera;
 a lighting unit;
 an entryway interface;
 a door lock;
 an occupancy sensor;
 a ceiling fan;
 an electrical outlet;
 a security sensor;
 a security hub;
 a garage door opener;
 a control panel;
 a border router;
 a hub;
 a network-connected speaker;
 a television;
 a remote control;
 a network-connected television;
 a network-connected media streaming device; or
 any combination thereof.

14. The wireless network device of claim 8, wherein the connection parameters included in the CONNECT_REQ advertising packet include:
 a length of fixed-length packets transmitted by the wireless network device in the peripheral role;
 a maximum number of retransmissions per connection interval;
 a frequency hopping sequence for the connection;
 a connection interval length;
 a peripheral latency; and
 a supervision timeout value.

* * * * *